Dec. 7, 1926.
J. C. SCHELLIN
1,610,165
FIRE HOSE COUPLING
Filed June 10, 1925
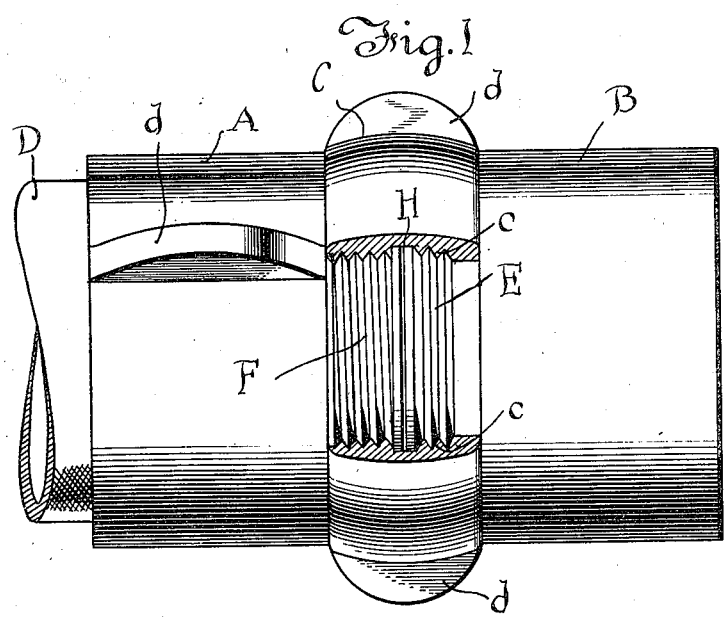
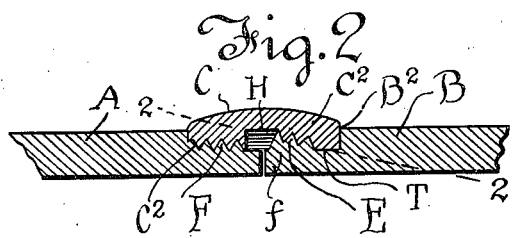
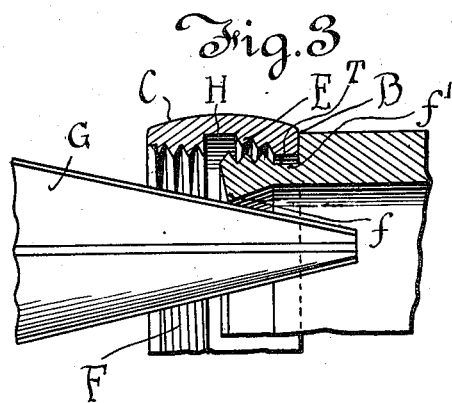
Inventor
John C. Schellin
By Hiram Swartz, Atty.

Patented Dec. 7, 1926.

1,610,165

UNITED STATES PATENT OFFICE.

JOHN C. SCHELLIN, OF WOOSTER, OHIO.

FIRE-HOSE COUPLING.

Application filed June 10, 1925. Serial No. 36,271.

My invention relates to improvements in fire hose couplings and method of constructing the same; and its principal objects are, first, to provide improved means for permanently connecting the swivel ring—so called—to the female section of the coupling; secondly, to materially increase the tensile strength and remedy defects of the old style groove type of the female section by making a better grip for the swiveling threads of said section and of the swivel ring upon each other; and, thirdly, to simplify and cheapen the construction, make all threads of the coupling engage the full length and depth of opposing threads without straining the metal in the operation, and without unevenness in the bore of the coupling; all as hereinafter described and stated in the appended claims.

My invention is illustrated by the accompanying drawings in which similar letters and figures of reference indicate like parts. Referring thereto, Fig. 1 is a side view of a fire hose coupling embodying my invention, a portion of the swivel ring being cut away for better illustration.

Fig. 2 is a sectional portion of Fig. 1 showing the swiveling members in operative connection; and Fig. 3 is a similar sectional portion showing the swiveling threads disconnected, and the means I employ for joining them together.

In the drawings, A is the male or screw threaded member of the coupling, such as is in common use, and B is the female section thereof, and C the swivel ring or coupling section which draws and holds the male and female sections in coupled relation. D is a connected portion of ordinary fire hose, and $d$, $d$, $d$ are projections for engaging a wrench in the usual well known way. E is a series of still or endless threads around the terminus of the female section intended to engage a like series on the adjacent inner surface of the swivel ring C, as shown at $c$, $c$, Fig. 1, where the ring is cut apart for illustration.

My invention relates and my claims apply particularly to the novel method of securing the female hose section B to the tapered still threads of the swivel ring C; the series of still threads around the terminus of the female hose section being of uniform depth and inclining outwardly at an angle with the surface of said section, as shown at $C^2$ Fig. 2, and adapted to loosely register with and engage the corresponding series of still threads of the swivel ring which are set at a like incline, indicated by the dotted line 2—2 in Figs. 2 and 3; and both series of still threads are, by a circumferential groove $f'$ spaced some distance apart from the shoulder $B^2$ of the female section. Such spacing apart facilitates the rolling out of the threaded portion of the female section so as to accurately engage the corresponding threads of the swivel ring on the incline aforesaid, as shown in Fig. 2. Such rolling is accomplished mechanically by pressure of a roll G, (Fig. 3) in a lathe, which, when driven inwardly a sufficient distance, permanently enmeshes the sloping threads of the section with those of the swivel ring to full and uniform depth, as shown in Fig. 2.

Moreover, by reason of the circumferential groove T intervening between the shoulder $B^2$ and the series of still threads E, and the gradual thickening of the terminus $f$ of the member B, by the bead $f$, and the incline of the series of still threads on the swivel ring C, it is possible to press outwardly the series of still threads on the member B without strain of the metal, so as to loosely engage the corresponding still threads of the ring, and at the same time make the inner surface of the said member level with the inner surface of the opposite member A, and also materially increase the tensile strength of the union.

The still threads of both section B and ring C are thus of uniform depth, and a wider marginal thread fits snugly into the circumferential groove T, whereby the grip of the members upon each other is considerably intensified, and the junction of the several members is made air and water tight without the use of packing. It will be understood that one side of the inner periphery of the swivel ring C, opposite the series of tapered still threads is equipped with a series of helical threads, on a plane with the axis of the coupling, adapted to engage and couple with the threaded end of the male hose section, or other similar connection, in the usual well known way; and no claim is made specifically to said helical series, except in combination with said tapered still thread series.

Provision is also made for the insertion of suitable packing, if desired, between the meeting ends of the male and female hose sections, by the interposition of an annular groove H between said still and helical threads; but such feature is not essential to my invention.

As a means for adding lineal strength to the still thread part of the coupling, the swivel ring C is preferably provided with a relatively wide annular rim around its inner periphery, adapted to engage and register with a corresponding circumferential groove T adjacent to the shoulder of the female hose section, substantially as shown, which groove also affords aid for the rolling out of the inclined series of still threads, as aforesaid.

Having thus fully described my invention, and the method of its construction, what I claim as new is—

1. In a hose coupling of the character described, in combination with one section thereof, said section having a series of still threads around its terminal portion, said threads gradually increasing in diameter towards the end of said section, a swivel ring section, said ring having a like series of still threads around one side of its inner periphery, adapted to engage and register with the still threads of said hose section, and a series of helical threads around the opposite side of its inner periphery, adapted to engage the threaded end of a male hose section, substantially as set forth.

2. A hose coupling having, in combination, a section thereof terminating with a series of still threads gradually increasing in diameter outwardly toward the end of said section, the terminal portion gradually increasing in thickness to its end, and a swivel ring having a like series of still threads around one side of its inner periphery, said series being adapted to engage and register with the series of still threads of said section loosely, said ring further provided with a series of helical threads around the opposite side of its inner periphery adapted to engage the threaded end of the male section of the coupling, substantially as set forth.

3. In a hose coupling, in combination with the female section thereof, said section terminating with a series of still threads of uniform depth gradually increasing in diameter toward the end of said section, the terminus of said section gradually increasing in thickness from a circumferential groove therein, and a swivel ring, having a like series of still threads on one side of its inner periphery in operative engagement with said series of the female section, substantially as set forth.

In witness whereof I hereunto set my hand this 14th day of April, A. D. 1925.

JOHN C. SCHELLIN.